(12) United States Patent
Deck et al.

(10) Patent No.: US 7,460,229 B2
(45) Date of Patent: Dec. 2, 2008

(54) BEAM ALIGNMENT IN SPECTROSCOPIC MICROSCOPES

(75) Inventors: Francis J. Deck, Madison, WI (US); Joe Hodkiewicz, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 387 days.

(21) Appl. No.: 11/332,675

(22) Filed: Jan. 13, 2006

(65) Prior Publication Data

US 2007/0165221 A1   Jul. 19, 2007

(51) Int. Cl.
  *G01J 3/42* (2006.01)
  *G01J 3/40* (2006.01)
  *G01B 11/00* (2006.01)

(52) U.S. Cl. .................... 356/326; 356/302; 356/399

(58) Field of Classification Search .................. None
  See application file for complete search history.

(56) References Cited

U.S. PATENT DOCUMENTS 4,630,925 A * 12/1986 Schiller et al. .............. 356/318
5,672,816 A * 9/1997 Park et al. .................. 73/105
6,661,509 B2   12/2003 Deck et al.

* cited by examiner

*Primary Examiner*—Gregory J Toatley
*Assistant Examiner*—Gordon J Stock
(74) *Attorney, Agent, or Firm*—DeWitt Ross & Stevens; Charles B. Katz; Michael C. Staggs

(57) ABSTRACT

A spectroscopic microscope includes a laser or other light source which emits light from the entrance aperture of its spectrograph, and also includes a light sensor situated on the microscope sample stage upon which a specimen is to be situated for microscopic/spectrometric analysis. The sample stage is positioned such that the signal from the light sensor is maximized, thereby indicating good alignment between the sample stage and spectrograph. Additionally, the microscope sample stage bears a light source which can emit light to be detected by a light sensor situated at the vantage point of a user/viewer utilizing the microscope, and such a light sensor can simply take the form of a video camera or other image recordation unit associated with the microscope. The sample stage can also be positioned to optimize the signal at the light sensor to signify good alignment between the sample stage and the microscope.

16 Claims, 2 Drawing Sheets

BEAM ALIGNMENT IN SPECTROSCOPIC MICROSCOPES

FIELD OF THE INVENTION

This document concerns an invention relating generally to spectroscopic microscopes, and more specifically to devices and methods for attaining proper alignment of optical beams in spectroscopic microscopes.

BACKGROUND OF THE INVENTION

U.S. Pat. No. 6,661,509 describes exemplary devices and methods for attaining alignment of optical beams in spectroscopic microscopes, and these devices and methods will now be summarized with reference to the accompanying FIG. 1. It should be understood that this is only a brief summary, and more details can be found in U.S. Pat. No. 6,661,509, which is incorporated by reference herein such that its contents should be regarded as a part of this document.

A spectroscopic microscope system, designated generally by the reference numeral 10, includes an optical microscope depicted within the phantom/dashed lines 11. The microscope 11 includes an objective optical element 12 and an ocular optical element 14 (here depicted as lenses, though reflective elements, e.g., mirrors, could be used instead of refractive elements such as lenses). Light from a sample located at a sample position 16 is transmitted through the objective optical element 12 to the ocular optical element 14 on a microscope beam path 17 to form an image that can be viewed by a viewer either directly through the ocular optical element 14, or with the use of video camera 15 and a video display terminal (not shown).

Molecular spectrometry may also be performed on the sample. An illuminating light beam 21 is provided from a light source 20 (depicted here as a laser, though other light sources may be used) through a beam path adjuster 22 to a mirror 24 which redirects the illuminating beam 21 on a path toward the mirror 26. The mirror 26 deflects the illuminating beam 21 onto a path coincident with the microscope beam path 17. The objective lens 12 focuses the illuminating beam 21 onto a focal point 28, thereby causing any sample at this point to interact with the illuminating beam 21 and scatter, emit, or otherwise deliver light having different wavelength content along return beam path 30 after being collected by the objective optical element 12. The return beam 30 is deflected by the mirror 26 onto a path coincident with the illuminating beam path 21, and is allowed to pass through mirror 24 (which is a dichroic mirror chosen to pass wavelengths along one or more ranges other than those of the illuminating beam 21). The return beam 30 passes through a beam path adjuster 34 (i.e., a set of optical elements capable of shifting the axis of the return beam 30), and through an input lens 35 which focuses the beam 30 onto the spectrograph input aperture 36 of spectrograph 37. The spectrograph 37 may be formed to spatially distribute the wavelengths of light in the return beam 30 (e.g., by a Czerny-Turner monochromator or other arrangement, not shown), with the wavelengths then being incident upon a detector 38 which detects the intensity of the light at the various wavelengths to provide an output signal which characterizes properties of the sample.

The beam path adjusters 22 and 34 are provided in order to precisely align the illuminating beam 21 and return beam 30 with the focal point 28 and spectrograph input aperture 36. These are fed adjustment signals by a control system 44, which relies on input from detector 38 (as discussed below) and from an alignment unit 39 situated on or within the sample stage 40 of the microscope 11. The alignment unit 39 includes a stage entrance aperture 41 which is positioned by the operator, by viewing the alignment unit 39 with the ocular optical element 14 and/or video camera 15, to coincide with the central axis of the microscope optical beam 17. The alignment unit 39 includes with its interior a stage light source 60, e.g., a high intensity light emitting diode (LED), actuated by line 62 communicating with control system 44, and a stage light sensor 65, e.g., a silicon photodiode situated to receive light transmitted through the LED/stage light source 60, with the stage light sensor 65 emitting a stage light sensor output signal to control system 44 along line 68 in response to receipt of light. The control system 44 performs alignment by turning on the stage light source 60 and then adapting the beam path adjuster 34 until the return beam 30 from the stage light source 60 registers with maximum intensity on the detector 38, thereby indicating that such a return beam 30 would also be well-aligned with the spectrograph input aperture 36 and detector 38 if the return beam 30 was generated via the illuminating light beam 21 from the light source 20. Similarly, the beam path adjuster 22 can be adapted by the control system 44 until the stage light sensor 65 measures maximum output from the light source 20, indicating that the illuminating light beam 21 is properly aligned. In other words, the input or datum beam 21 for spectrometry is optimized via beam path adjuster 22 by signals from the stage light sensor 65 in the alignment unit 39 (with the stage light sensor 65 being stimulated by the light source 20), and the return beam 30 for spectrometry is optimized via beam path adjuster 34 by signals from the detector 38 in the spectrograph 37 (with the detector 38 being stimulated by the stage light source 60). Note that the control system 44 communicates with the light source 20 by line 46, with the beam adjuster 22 by line 47, with the detector 38 by line 48, and with the beam adjuster 34 by line 49, as well as with the stage light sensor 65 via line 68 and the stage light source 60 via line 62. Once alignment is achieved, the alignment unit 39 may be removed from the sample stage 40 (if not built therein) so that the microscope system 11 may be used for analyzing samples.

The foregoing arrangement is beneficial, but it still has limitations. In particular, alignment of the alignment unit 39 (more particularly its stage entrance aperture 41) with the microscope beam path 17 is prone to error: since a user views the stage entrance aperture 41 through the eyepiece 14 (or via the video camera 15) and subjectively determines when the stage entrance aperture 41 is centered in the field of view, users can err in deciding when the alignment unit 39 seems to be properly situated. This in turn poses problems for adjustment of the spectrometry input beam 21 via the beam path adjuster 22, and of the spectrometry return beam 30 via the beam path adjuster 34. In particular, if the alignment unit 39 is significantly out of alignment—this misalignment being compounded by any misalignment in the beam path adjusters 22 and 34—the light from the light source 20 may not reach the stage light sensor 65 and generate a signal, and similarly the light from the stage light source 60 may not reach the detector 38 and generate a signal. Without such a signal, one cannot seek to optimize the spectrometry input and return beams 21 and 30 by seeking to maximize the signal at the stage light sensor 65 and/or detector 38. In this case, one must vary the positions of the beam path adjusters 22 and 34 and the alignment unit 39 and "hunt" for a signal at the detector 38, at which point the aforementioned methods become effective.

DETAILED DESCRIPTION OF PREFERRED VERSIONS OF THE INVENTION

Figure 1:
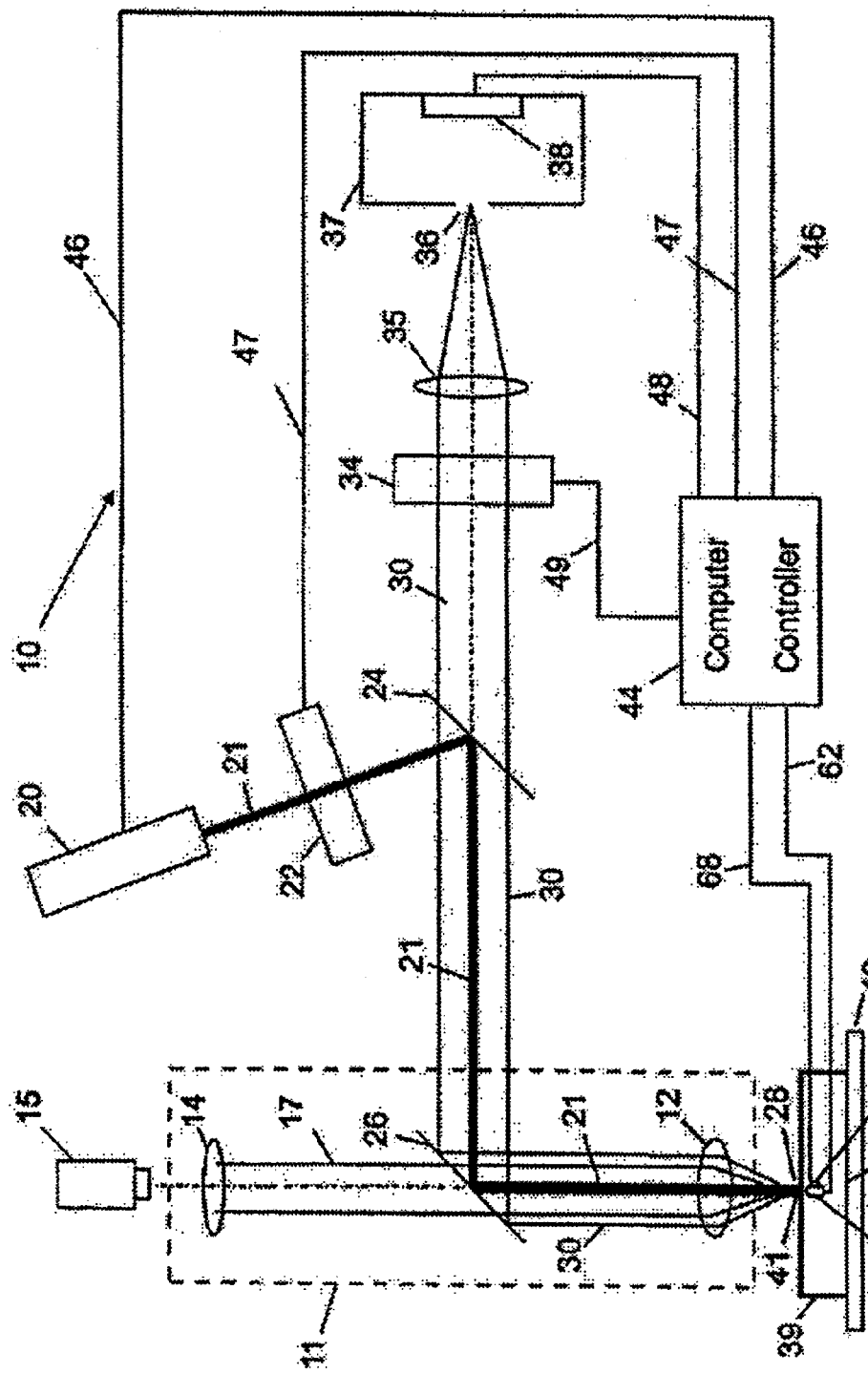
FIG. 1 is a schematic depiction of the exemplary spectroscopic microscope of U.S. Pat. No. 6,661,509.
Figure 2:
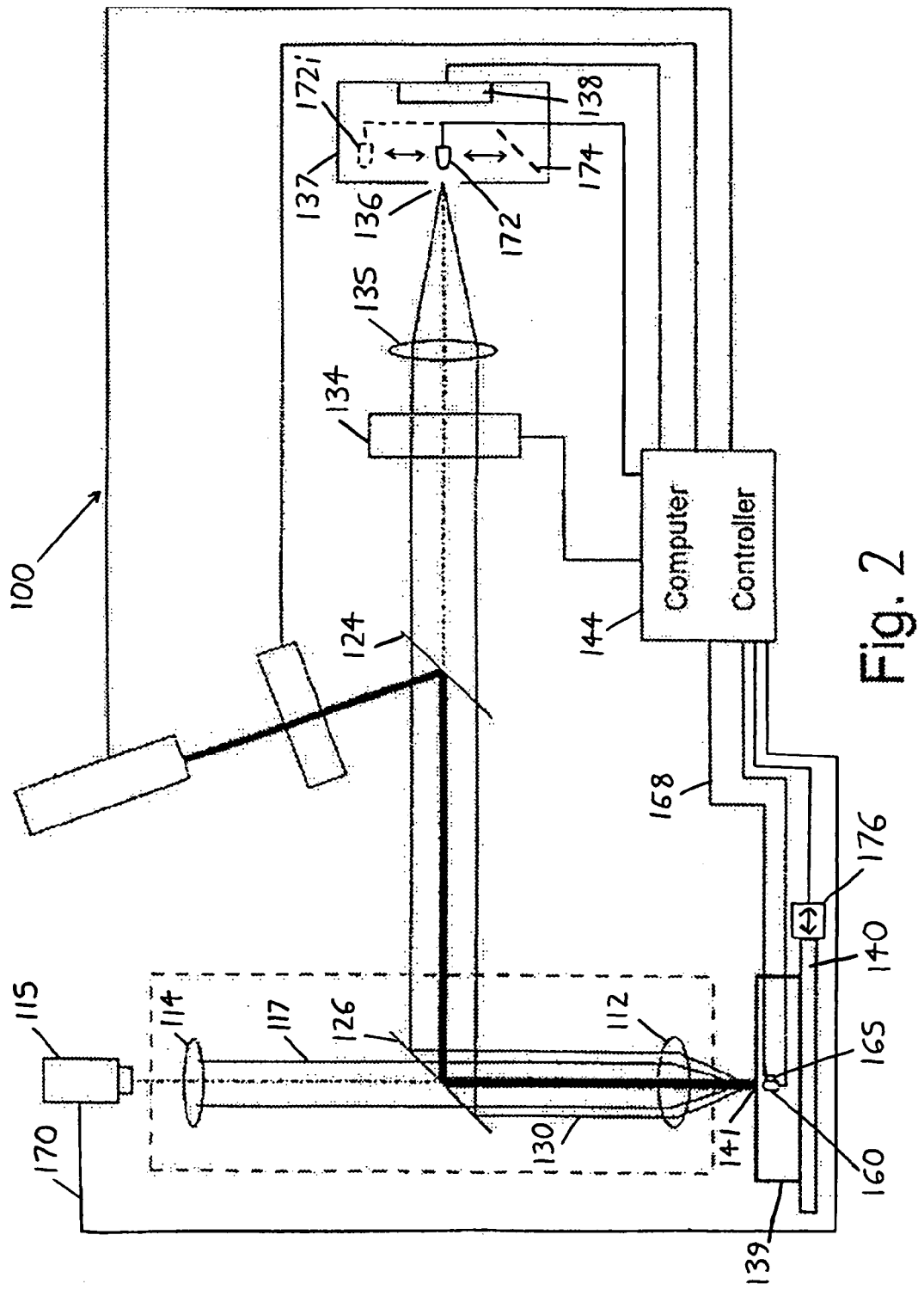
FIG. 2 is a schematic depiction of an improved version of the exemplary spectroscopic microscope of FIG. 1.

The invention involves improvements on the aforementioned methods and devices which are intended to at least partially solve the aforementioned problems. Referring to FIG. 2, an improved version of the microscope/spectrometer 10 of FIG. 1 is depicted at 100, and it includes generally the same arrangement as the microscope/spectrometer 10 of FIG. 1, with a few additions and modifications. As in the spectrometer 10, the spectrometer 100 includes a sample stage 140 whereupon a sample to be analyzed may be situated; one or more optical elements (112, 114, 126, 135) spaced from the sample stage 140, the optical elements transferring light to and from the sample stage 140 (and which may include an objective element 112 adjacent the sample stage 140, and a microscope ocular element 114, i.e., an eyepiece); and a spectrograph 137 including a spectrograph entrance aperture 136 and a detector 138, which receive light from the optical elements 112, 126, 124, and 135. The alignment unit 139 is again provided on the sample stage 140, with the alignment unit 139 including the stage light source 160 and the stage light sensor 165 situated behind the stage entrance aperture 141.

A viewer light sensor 115, e.g., a photosensitive element or array of elements, is then preferably provided to receive light from the optical elements 112, 126, and 114, and more particularly from the stage light source 160 at the alignment unit 139 on the sample stage 140. As shown in FIG. 2, this viewer light sensor 115 may take the form of the video camera 115, though other forms of sensors could be used. The stage light source 160 may therefore be actuated to emit a microscope alignment light signal through the stage entrance aperture 141, and this microscope alignment light signal might be viewed by a user through the eyepiece 114 so that at least an attempt at manual alignment can be made (i.e., the user can shift the alignment unit 139 so that the stage entrance aperture 141 at least appears to be centered in the eyepiece 114). However, alignment of the microscope beam path 117 is primarily performed by having the viewer light sensor 115 receive the microscope alignment light signal from the optical elements 112, 126, and 114 and generate a corresponding output signal from the viewer light sensor 115. The output signal from the viewer light sensor 115 is then supplied (e.g., via line 170) to the control system 144, which can reposition the stage light source 160 (or more generally the alignment unit 139) in response to the output signal from the viewer light sensor 115. As an example, if the viewer light sensor 115 is provided in the form of a video camera, the control system 144 can utilize the pixel values captured by the camera 115, and can supply instructions which attempt to move the alignment unit 139 so that the greatest/brightest pixel values are centered within the pixel array (i.e., so that the stage light source 160 is aligned with the central viewing axis of the viewer light sensor/video camera 115).

The spectrograph 137 further includes a return light source 172 which is positionable in line with the spectrograph entrance aperture 136 and the optical elements 135, 124 and 126, and which may be actuated to emit a spectrometer alignment light signal through the spectrograph entrance aperture 136. The optical elements 135, 124, 126 and 112 may then deliver the alignment light signal to the alignment unit 139. The stage light sensor 165 in turn emits an output signal in response to any spectrometer alignment light signal received through the stage entrance aperture 141. The output signal from the stage light sensor 165 can then be supplied to the control system 144 (as by line 168), which may reposition the stage light sensor 165 (and/or adjust the beam adjuster 134) to maximize the output signal from the stage light sensor 165, thereby indicating that the return beam 130 has achieved suitable alignment. It is notable that while this arrangement may seem duplicative of the alignment achieved by the use of the stage light source 160 and detector 138, alignment by use of the return light source 172 and stage light sensor 165 can be superior in that the return light source 172 emits an "ideal" alignment signal: the signal is emitted from the spectrograph entrance aperture 136, which has a fixed position (unlike the movable position of the stage entrance aperture 141), and the alignment light signal is projected from the spectrograph entrance aperture 136 onto the alignment unit 139. The spot from the alignment light signal can then be coarsely aligned with the stage entrance aperture 141 (and the stage light sensor 165) by user visualization, and fine alignment can occur between the spectrograph entrance aperture 136 and the stage light sensor 165 by having the control system 144 reposition the alignment unit 139 to attain signal maximization.

Within the spectrograph 137, the return light source 172 is preferably movable between an emission position wherein the return light source 172 emits the spectrometer alignment light signal through the spectrograph entrance aperture 136 and to the optical elements, and an inactive position (shown in phantom at 172i) wherein the return light source 172 does not emit the spectrometer alignment light signal through the spectrograph entrance aperture 136. This allows the spectrograph 137 to be used for ordinary purposes (i.e., to receive light into the spectrograph entrance aperture 136 for delivery to the detector 138), or to emit the spectrometer alignment light signal from the spectrograph entrance aperture 136 for delivery to the stage light sensor 165. As an alternative to moving the return light source 172, a movable reflector 174 could be provided which receives the spectrometer alignment light signal and redirects it through the spectrograph entrance aperture 136 and to the optical elements, with the reflector 174 being movable between an inactive position (at the position of the reflector 174 shown in FIG. 2) and an emission position (at the position occupied by the return light source 172 in FIG. 2).

In the foregoing arrangement, the stage light source 160, stage light sensor 165, and stage entrance aperture 141 are preferably repositioned as a unit, as by repositioning the entirety of the alignment unit 139, rather than by having the stage light source 160 and stage light sensor 165 being independently repositionable with respect to the alignment unit 139. Most preferably, the alignment unit 139 is removably attached to the sample stage 140, with the sample stage 140 being repositionable in three dimensions, or at least in the directions perpendicular to the direction along which the spectrometer alignment light signal enters the stage light sensor 165. Repositioning of the alignment unit 139 may be achieved by use of suitable actuators 176, such as stepping motors. The foregoing alignment system can be (but need not be) used as a replacement to the prior alignment system of U.S. Pat. No. 6,661,509, or it can be used alongside the prior alignment system. In this respect, the spectrometer alignment light signal emitted by the return light source 172 and detected by the stage light sensor 165 may seem redundant with the return beam 130 emitted by the stage light source 160 and detected by the detector 138 (and the latter could even be omitted), but the two signals could be used in tandem for more rapid and/or optimal alignment. If both signals are used, it is notable that the stage light source 160 might itself serve as a light sensor for detection of light by the return light source 172, in addition to or instead of the stage light sensor 165, since some light sources (such as LEDs) will generate current in response to received light as well as generating light in response to received current. In similar respects, the return light source 172 could be used as a light sensor as well as a light emitter, and could be used in place of (or in addition to) the detector 138 for detection of the return beam 130.

The return light source 172 and/or the reflector 174 are preferably repositionable within the spectrograph 137 by use of stepping motors, solenoid-actuated linkages or pivots, or similar arrangements between their emission and inactive positions. In this respect, it is useful to have an emitting end of a fiberoptic cable serve as the return light source 172, with the cable end being movable and the light source supplying the fiberoptic cable being fixed, for sake or durability and reliability.

It should be understood that a preferred version of the invention has been shown and described above to illustrate possible features of the invention, and the invention can take other forms which are different from that of the preferred version. In particular, while the invention has been shown and described as implemented on a Nicolet Almega spectrometer (Thermo Electron, Madison, Wis., USA), it could be used on other types of spectrometers, microscopes, or combinations of these devices. Thus, the invention could appear vastly different from the form shown in the schematic views of FIGS. 1-2. In particular, recall from the prior discussion that the optical elements could be formed of refractive elements (e.g., lenses), reflective elements (e.g., mirrors), or combinations thereof, and more or less optical elements than those shown could be present.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A spectrometer comprising:
    a) sample stage whereupon a sample to be analyzed may be situated;
    b) a spectrograph including a spectrograph entrance aperture and a detector;
    c) one or more optical elements through which light is delivered into the spectrograph entrance aperture to be received by the detector;
    d) a return light source emitting a spectrometer alignment light signal through the spectrograph entrance aperture and to the one or more optical elements;
    e) a stage light sensor at or adjacent to the sample stage, the stage light sensor receiving the spectrometer alignment light signal from the one or more optical elements, wherein the stage light sensor emits a stage light sensor output signal in response to receipt of the spectrometer alignment light signal; and
    f) a control system receiving the stage light sensor output signal so as to reposition the stage light sensor and the sample stage in response thereto, wherein the sample stage is repositioned along one or more planes oriented at least substantially perpendicular to the direction along which the spectrometer alignment light signal travels to reach the stage light sensor.

2. The spectrometer of claim 1 wherein the return light source is movable between:
    a) an emission position wherein the return light source emits the spectrometer alignment light signal though the spectrograph entrance aperture and to the one or more optical elements; and
    b) an inactive position wherein the return light source does not emit the spectrometer alignment light signal though the spectrograph entrance aperture.

3. The spectrometer of claim 1 further comprising a reflector receiving the spectrometer alignment light signal and redirecting the spectrometer alignment light signal though the spectrograph entrance aperture and to the one or more optical elements.

4. The spectrometer of claim 1 wherein a stage entrance aperture is situated at the sample stage between the one or more optical elements and the stage light sensor.

5. The spectrometer of claim 3 wherein the reflector is movable between:
    a) an emission position wherein the reflector receives the spectrometer alignment light signal and redirects the spectrometer alignment light signal though the spectrograph entrance aperture and to the one or more optical elements; and
    b) an inactive position wherein the reflector does not redirect the spectrometer alignment light signal to the one or more optical elements.

6. The spectrometer of claim 4 further comprising an alignment unit situated on the sample stage, the alignment unit including the stage light sensor and the stage entrance aperture therein.

7. The spectrometer of claim 6 wherein the sample stage is movable along planes oriented at least substantially perpendicular to the direction along which the spectrometer alignment light signal arrives at the alignment unit.

8. The spectrometer of claim 6 wherein the alignment unit is movable with respect to the sample stage.

9. The spectrometer of claim 8 further comprising:
    a) a stage light source at the alignment unit, the stage light source being actuatable to emit a microscope alignment light signal through the stage entrance aperture and to at least some of the one or more optical elements; and
    b) a viewer light sensor situated to receive the microscope alignment light signal from at least some of the one or more optical elements, and generating a corresponding viewer light sensor output signal therefrom.

10. A spectrometer comprising:
    a) a sample stage whereupon a sample to be analyzed may be situated;
    b) an alignment unit situated on the sample stage, the alignment unit having a stage entrance aperture and a stage light source, with the stage light source emitting a microscope alignment light signal through the stage entrance aperture;
    c) one or more optical elements spaced from the sample stage, the one or more optical elements receiving the microscope alignment light signal from the stage entrance aperture, wherein the one or more optical elements include an objective element and an ocular element, the objective element being situated adjacent the sample stage and the ocular element being situated adjacent the viewer light sensor;
    d) a viewer light sensor receiving the microscope alignment light signal from the one or more optical elements and generating a corresponding viewer light sensor output signal;

e) a control system receiving the viewer light sensor output signal and repositioning the stage light source in response thereto.

11. The spectrometer of claim 10 wherein the alignment unit is removable from the sample stage.

12. The spectrometer of claim 10 further comprising
   a) a spectrograph including:
      (1) a spectrograph entrance aperture, and
      (2) a return light source actuatable to emit a spectrometer alignment light signal through the spectrograph entrance aperture;
   b) a stage light sensor within the alignment unit, the stage light sensor emitting a stage light sensor output signal in response to any spectrometer alignment light signal received by the stage light sensor through the stage entrance aperture;
      wherein the stage light sensor is repositioned in response to the stage light sensor output signal.

13. The spectrometer of claim 10 further comprising at least one actuator:
   a) in communication with the control system, and
   b) repositioning the stage light source.

14. The spectrometer of claim 13 wherein the stage light source and the stage entrance aperture are repositioned together.

15. The spectrometer of claim 13 wherein the stage light source is repositioned by repositioning the sample stage.

16. A spectrometer comprising:
   a) a sample stage whereupon a sample to be analyzed may be situated;
   b) an alignment unit situated on the sample stage, the alignment unit including:
      (1) a stage entrance aperture,
      (2) a stage light source actuatable to emit a microscope alignment light signal through the stage entrance aperture, and
      (3) a stage light sensor emitting a stage light sensor output signal in response to light received by the stage light sensor through the stage entrance aperture;
   c) a spectrograph including:
      (1) a spectrograph entrance aperture,
      (2) a detector emitting a detector output signal in response to light received by the detector through the spectrograph entrance aperture, and
      (3) a return light source actuatable to emit a spectrometer alignment light signal through the spectrograph entrance aperture;
   d) a viewer light sensor spaced from the sample stage, the viewer light sensor emitting a viewer light sensor output signal in response to light received by the viewer light sensor;
   e) one or more optical elements spaced from the sample stage:
      (1) from which the microscope alignment light signal is received from the stage entrance aperture and delivered to the viewer light sensor, and
      (2) from which the spectrometer alignment light signal is received from the spectrograph entrance aperture and delivered to the alignment unit; and
   f) a control system receiving the viewer light sensor output signal and repositioning the stage light source in response thereto.

* * * * *

UNITED STATES PATENT AND TRADEMARK OFFICE
CERTIFICATE OF CORRECTION

PATENT NO. : 7,460,229 B2
APPLICATION NO. : 11/332675
DATED : December 2, 2008
INVENTOR(S) : Deck et al.

Page 1 of 1

It is certified that error appears in the above-identified patent and that said Letters Patent is hereby corrected as shown below:

Col. 5, Claim 1, line 45
replace "a) sample stage whereupon a sample to be analyzed may be situated"
with --a) a sample stage whereupon a sample to be analyzed may be situated--

Col. 6, Claim 3, line 12
replace "redirecting the spectrometer alignment light signal though the"
with --redirecting the spectrometer alignment light signal through the--

Signed and Sealed this

Third Day of February, 2009

JOHN DOLL
*Acting Director of the United States Patent and Trademark Office*